United States Patent
Wong

(10) Patent No.: US 9,697,060 B2
(45) Date of Patent: *Jul. 4, 2017

(54) RESERVING SPACE IN A MAIL QUEUE

(71) Applicant: International Business Machines Corporation, Armonk, NY (US)

(72) Inventor: Kelvin Wong, Eastleigh (GB)

(73) Assignee: Internation Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/371,385

(22) Filed: Dec. 7, 2016

(65) Prior Publication Data

US 2017/0083388 A1      Mar. 23, 2017

Related U.S. Application Data

(63) Continuation of application No. 14/849,881, filed on Sep. 10, 2015, now Pat. No. 9,547,539.

(51) Int. Cl.
*G06F 9/54* (2006.01)

(52) U.S. Cl.
CPC ............................... *G06F 9/546* (2013.01)

(58) Field of Classification Search
None
See application file for complete search history.

(56) References Cited

U.S. PATENT DOCUMENTS

| 6,170,003 | B1 | 1/2001 | Benkual et al. |
| 6,347,089 | B1 | 2/2002 | Tsui et al. |
| 8,982,695 | B2 | 3/2015 | Mejia |
| 9,350,597 | B1 | 5/2016 | Wong |
| 2004/0107240 | A1 | 6/2004 | Zabarski et al. |
| 2014/0379999 | A1 | 12/2014 | Pelissier et al. |

OTHER PUBLICATIONS

Appendix P, List of IBM Patents or Patent Applications Treated As Related, 2 pages, dated Jan. 12, 2017.
Wong, "Reserving Space in a Mail Queue", U.S. Appl. No. 14/849,881, filed Sep. 10, 2015, 38 pages.
Wong, "Reserving Space in a Mail Queue", U.S. Appl. No. 15/159,892, filed May 20, 2016, 29 pages.

*Primary Examiner* — Brian W Wathen
*Assistant Examiner* — Abdou Seye
(74) *Attorney, Agent, or Firm* — Bryan D. Wells

(57) ABSTRACT

A mail handler is provided. The mail handler manages a source queue for incoming messages. The source queue has a first count of slots in memory and is associated with a source read pointer and a source write pointer. The mail handler manages the source write pointer and the source read pointer. The mail handler also manages a destination queue for outgoing messages. The destination queue has a second count of slots in memory and is associated with a destination read pointer and a destination write pointer. The mail handler advances the destination write pointer in response to at least one of (i) transferring one or more messages form the source queue to the destination queue and (ii) reserving one or more slots in the destination queue. The at least one processor advances the destination read pointer in response to reading at least one message from the destination queue.

1 Claim, 5 Drawing Sheets

RESERVING SPACE IN A MAIL QUEUE

BACKGROUND OF THE INVENTION

The present invention relates generally to the field of computer mail queues, and more particularly to reserving space in a mail queue in memory from which a processor reads messages.

In computer science, mail queues (a.k.a. message queues) are software-engineering components used for inter-process communication (IPC), or for inter-thread communication within the same process. Mail queues provide an asynchronous communications protocol, meaning that the sender and receiver of a message do not need to interact with the mail queue at the same time. Messages placed onto the queue are stored until the recipient retrieves them. Many implementations of mail queues function internally (i.e., within an operating system or within an application). Mail queues have implicit or explicit limits on the size of data that may be transmitted in a single message and the number of messages that may remain outstanding on the queue. Circular buffering is one strategy for a mail queue that has a fixed maximum size.

A circular buffer (a.k.a. a cyclic buffer or ring buffer) is a data structure that uses a single, fixed-size buffer as if it were connected end-to-end. A start pointer and an end pointer respectively identify the start and end of the circular buffer. A fixed number of slots exist between the start pointer and the end pointer. Data can be written to any slot in an empty buffer. Data fills a circular buffer in a direction from start pointer to end pointer, subsequent data being written to a slot that is adjacent to the most recently written to slot. If the slot that is associated with the end pointer is not empty, data is written to the slot that is associated with the start pointer. Writing subsequently stored data to the "beginning" of the circular buffer causes the memory addresses to "wrap around" (i.e., the memory addresses of newer data will have lower values than the memory addresses of older data). Once the buffer is full, slots are overwritten in a direction from the start pointer to the end pointer. In other words, less recently written data is removed from the buffer before more recently written data.

SUMMARY

According to one embodiment of the present disclosure, a method is provided. The method includes a mail handler managing a source queue for incoming messages from one or more agents, the source queue having a first count of slots and being associated with a source read pointer and a source write pointer, and wherein: the mail handler advances the source write pointer in response to at least one of: (i) determining that at least one of the one or more agents has posted at least one message to the source queue and (ii) reading one or more messages from the source queue; and the mail handler managing a destination queue for outgoing messages to at least one computer processor, the destination queue having a second count of slots and being associated with a destination read pointer and a destination write pointer, and wherein: the mail handler advances the destination write pointer in response to at least one of: (i) transferring one or messages from the source queue to the destination queue and (ii) reserving one or more slots in the destination queue; and the at least one computer processor advances the destination read pointer in response to reading at least one message from the destination queue.

According to another embodiment of the present disclosure, a computer program product for is provided. The computer program product comprises a computer readable storage medium and program instructions stored on the computer readable storage medium. The program instructions include program instructions to instruct a mail handler to manage a source queue for incoming messages from one or more agents, the source queue having a first count of slots and being associated with a source read pointer and a source write pointer, including: program instructions to instruct the mail handler to advance the source write pointer in response to at least one of: (i) determining that at least one of the one or more agents has posted at least one message to the source queue and (ii) reading one or more messages from the source queue; and program instructions to instruct the mail handler to manage a destination queue for outgoing messages to at least one computer processor, the destination queue having a second count of slots and being associated with a destination read pointer and a destination write pointer, including: program instructions to instruct the mail handler to advance the destination write pointer in response to at least one of: (i) transferring one or messages from the source queue to the destination queue and (ii) reserving one or more slots in the destination queue; and program instructions to instruct the at least one computer processor to advance the destination read pointer in response to reading at least one message from the destination queue.

According to another embodiment of the present disclosure, a computer system is provided. The computer system includes one or more computer processors, one or more computer readable storage media, and program instructions stored on the computer readable storage media for execution by at least one of the one or more processors. The program instructions include program instructions to instruct a mail handler to manage a source queue for incoming messages from one or more agents, the source queue having a first count of slots and being associated with a source read pointer and a source write pointer, including: program instructions to instruct the mail handler to advance the source write pointer in response to at least one of: (i) determining that at least one of the one or more agents has posted at least one message to the source queue and (ii) reading one or more messages from the source queue; and program instructions to instruct the mail handler to manage a destination queue for outgoing messages to at least one computer processor, the destination queue having a second count of slots and being associated with a destination read pointer and a destination write pointer, including: program instructions to instruct the mail handler to advance the destination write pointer in response to at least one of: (i) transferring one or messages from the source queue to the destination queue and (ii) reserving one or more slots in the destination queue; and program instructions to instruct the at least one computer processor to advance the destination read pointer in response to reading at least one message from the destination queue.

DETAILED DESCRIPTION

Mail systems are used to transfer messages from a first memory space to a second memory space. In one example of a mail system, the first memory space is a source queue in which various agents post messages and the second memory space is a destination queue from which a processor reads messages. A mail handler transfers messages from the source queue to the destination queue.

Embodiments of the present invention recognizes that it is advantageous to enable the processor to reserve one or more slots in the destination queue so that (i) the mail handler can immediately post completion message(s) concerning ongoing tasks and/or (ii) agents having direct access to the destination queue can post messages to the processor. While the processor could maintain a destination space that includes a separate mail queue for such messages, maintaining multiple queues in a destination space generally requires more resources than maintaining a single destination queue. Embodiments of the present disclosure also recognize that it is advantageous to provide a mail handler that has sole control over operations to reserve slots in the destination queue to, at least in part, reduce or eliminate various latencies of the mail system. Arbitration and interlocking mechanisms, for example, increase latency and are required if multiple agents can reserve slots in the destination queue. Embodiments of the present disclosure provide a mail handler with an ability to reserve, at the request of a processor, one or more slots in a destination queue while agents continue to post messages to a source queue.

Figure 1:
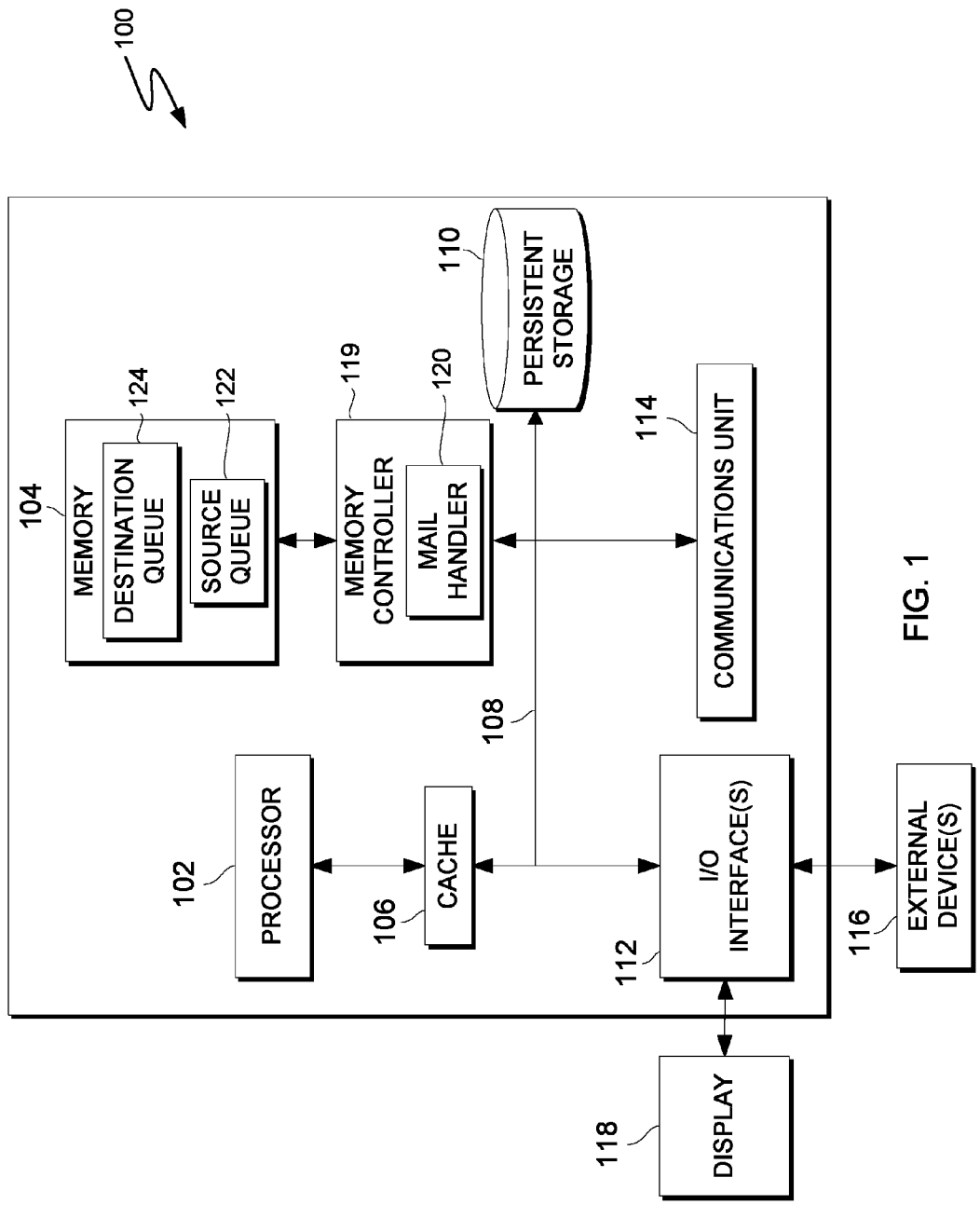
FIG. 1 is a block diagram that schematically depicts a computer system, in accordance with an embodiment of the present disclosure.

The present disclosure will now be described in detail with reference to the Figures. FIG. 1 is a block diagram that schematically depicts a computer system, in accordance with an embodiment of the present disclosure. Specifically, FIG. 1 depicts an embodiment of computer system 100. In various embodiments, computer system 100 is a computing device that can be a standalone device, a server, a laptop computer, a tablet computer, a netbook computer, a personal computer (PC), or a desktop computer. In another embodiment, computer system 100 represents a portion of a computing system utilizing clustered computers and components to act as a single pool of seamless resources. In general, computer system 100 can be any computing device or a combination of devices with access to mail handler 120, source queue 122, and destination queue 124, and with access to and/or capable of executing the logic described with respect to FIGS. 4 and 5.

Computer system 100 includes communications fabric 108, which provides communications between computer processor 102, memory 104, mail handler 120, persistent storage 110, communications unit 114, input/output (I/O) interface(s) 112. Communications fabric 108 can be implemented with any architecture designed for passing data and/or control information between processors (such as microprocessors, communications and network processors, etc.), system memory, peripheral devices, and any other hardware components within a system. For example, communications fabric 108 can be implemented with one or more buses.

Memory 104 and persistent storage 110 are computer readable storage media. Cache 106 is a fast memory that enhances the performance of processors 102 by holding recently accessed data and data near accessed data from memory 104. In various embodiments, memory 104 includes random access memory (RAM). In general, memory 104 can include any suitable volatile or non-volatile computer readable storage media. Memory 104 includes source queue 122 in a first memory space and destination queue 124 in a second memory space. As described herein, mail handler 120 manages source queue 122 and destination queue 124. Memory controller 119 is circuitry that executes logic for, at least in part, managing data that is transferred between processor 102 and memory 104 and vice versa. Memory controller 119 also manages data that is transferred between various agents and memory 104, as described herein. In the embodiment depicted in FIG. 1, memory controller 119 is a discrete microprocessor that is not integrated into processor 102. In other embodiments, memory controller 119 is integrated into processor 102 (i.e., memory controller 119 is an integrated memory controller [IMC] in such embodiments). In general, memory controller 119 is an electronic device that includes mail handler 120. Mail handler 120 is circuitry that is programmed in software or firmware to perform operations as described with respect to FIGS. 4 and 5. In general, the logic described in FIGS. 4 and 5 resides locally with respect to mail handler 120 or on persistent storage 110 provided that the logic is accessible by mail handler 120.

Program instructions and data can be stored in persistent storage 110 for execution and/or access by one or more of the processors 102 via cache 106 and memory 104. In some embodiments, persistent storage 110 includes a magnetic hard disk drive. Alternatively, or in addition to a magnetic hard disk drive, persistent storage 110 can include one or more solid state hard drives, one or more semiconductor storage devices, read-only memory (ROM), erasable programmable read-only memory (EPROM), flash memory, or any other computer readable storage media that is capable of storing program instructions or digital information.

Communications unit 114, in these examples, provides for communications with other data processing systems or devices. In these examples, communications unit 114 includes one or more network interface cards. Communications unit 114 may provide communications through the use of either or both physical and wireless communications links. Program instructions and data used to practice embodiments of the present invention and storage logic 124 may be downloaded to persistent storage 110 through communications unit 114.

I/O interface(s) 112 allows for input and output of data with other devices that may be connected to each computer system. For example, I/O interface 112 may provide a connection to external devices 116 such as a keyboard, keypad, a touch screen, and/or some other suitable input device. External devices 116 can also include portable computer readable storage media such as, for example, thumb drives, portable optical or magnetic disks, and memory cards. Software and data used to practice embodiments of the present invention can be stored on such portable computer readable storage media and can be loaded onto persistent storage 110 via I/O interface(s) 112. I/O interface(s) 112 also connect to a display 118.

Display 118 provides a mechanism to display data to a user and may be, for example, a computer monitor.

Figure 2:
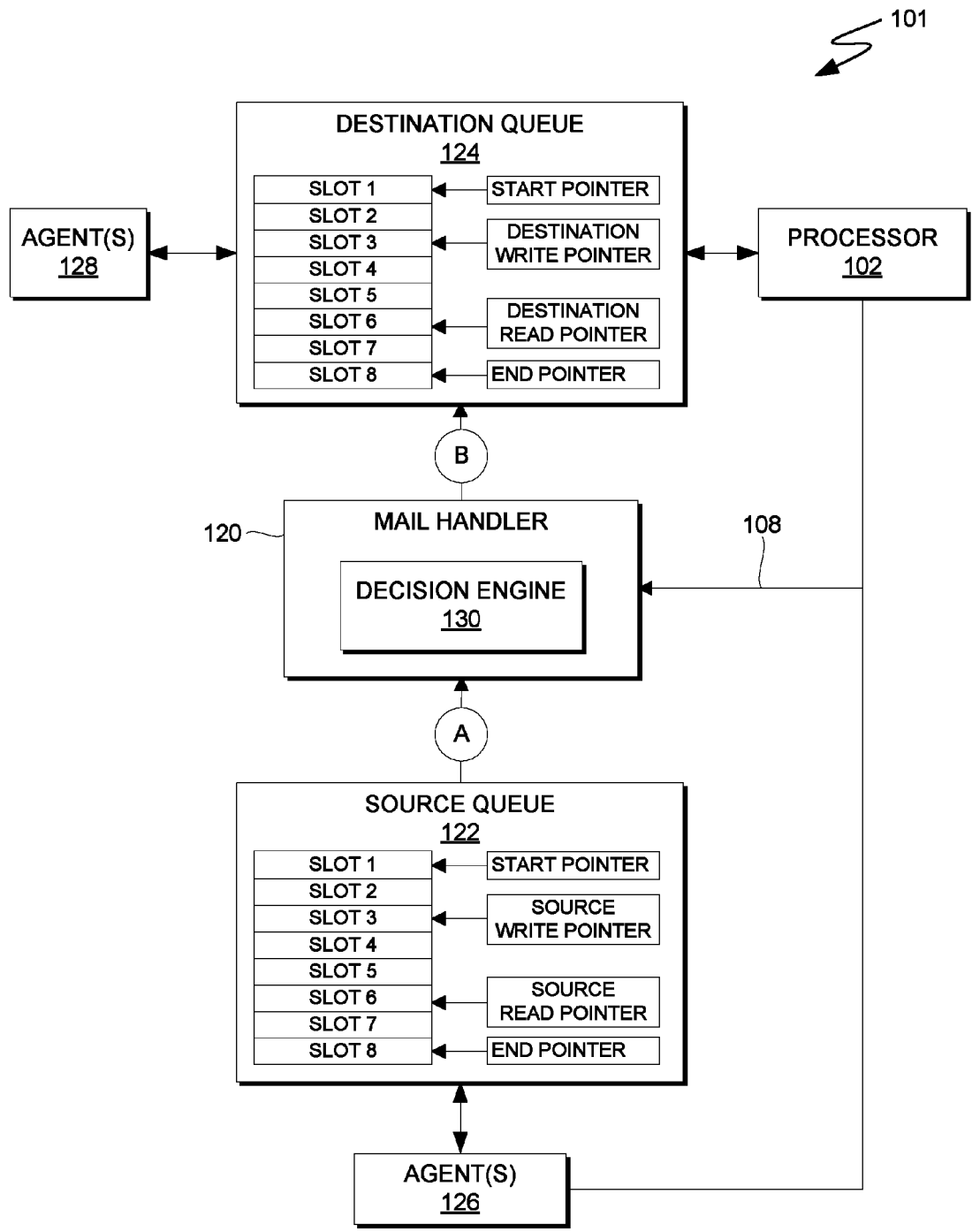
FIG. 2 is a functional block diagram that schematically depicts a mail system, in accordance with an embodiment of the present disclosure.

FIG. 2 is a functional block diagram that schematically depicts a mail system, in accordance with an embodiment of the present disclosure. Mail system 101 is a system that enables various agents of computer system 100 (e.g., processes that are loading data from persistent storage 110 or monitoring a network connection via communications unit 114) to communicate with processor 102. In the embodiment depicted in FIG. 2, Mail system 101 includes processor 102, mail handler 120, source queue 122, destination queue 124, agent(s) 126, and agent(s) 128. Mail handler 120 is communicatively connected to processor 102 and agent(s) 126 by communications fabric 108.

In the embodiment depicted in FIG. 1, source queue 122 and destination queue 124 are wrapping queues (e.g., circular buffers). Source queue 122 and destination queue 124 are each associated with a start pointer and an end pointer. The start and end pointers are address pointers that define two address ranges in memory that are respectively reserved for source queue 122 and destination queue 124. Each of source queue 122 and destination queue 124 are divided into a count of uniformly sized slots. A slot represents one or more addresses in memory at which data can be stored. In some embodiments, source queue 122 and destination queue 124 include the same count of slots. In other embodiments, source queue 122 and destination queue 124 have different counts of slots. In addition, source queue 122 is associated with a write pointer and a read pointer (i.e., a source write pointer and a source read pointer) that mail handler 120 manages based, at least in part, on communications (e.g., incoming messages) with agent(s) 126. Destination queue 124 is also associated with a write pointer and a read pointer (i.e., a destination write pointer and a destination read pointer). Mail handler 120 manages the destination write pointer based, at least in part, on communications with processor 102 (e.g., outgoing messages). Processor 102, however, manages the destination read pointer.

One function of mail handler 102 is to copy incoming messages from source queue 122 to destination queue 124 as outgoing message. To send one or more messages to processor 102, agent(s) 126 populate, beginning at the source write pointer, source queue 122 with n incoming messages. In addition, agent(s) 126 communicate that a count of n messages are to be transferred to the destination queue, as described with respect to FIG. 3. In response, mail handler 120 advances the source write pointer by n slots, handling address wrapping as necessary, and increments a count of pending messages by n. In addition, mail handler 120 reads, beginning at the source read pointer, n messages from source queue 122 and advances the source read pointer by n slots, handling address wrapping as necessary. With respect to destination queue 124, mail handler 120 writes, beginning at the destination write pointer, the messages that were read from source queue 122 to destination queue 124 as outgoing messages and advances the destination write pointer by n slots, handling address wrapping as necessary. Persons of ordinary skill in the art will understand that the count of incoming messages that mail handler 120 reads from source queue 122 and writes to destination queue 124 (as outgoing messages) can be greater than or less than n. Accordingly, mail handler 120 can also advance the destination write pointer by a count of slots that is greater or less than n. The process of transferring messages from source queue 122 to destination queue 124 is discussed in greater detail with respect to FIGS. 4 and 5.

In some embodiments, processor 102 periodically reads a message from a slot that is associated with the destination read pointer. If the message in the slot that is associated with the destination read pointer has changed, processor 102 determines that unread messages have been written in destination queue 124. In response, processor 102 reads one or more messages from destination queue 124 and updates the destination read pointer accordingly. In general, the destination read pointer and the destination write pointer will point to the same memory address (i.e., the same slot) if processor 102 has read all messages written to destination queue 124. In other embodiments, mail handler 120 generates a processor interrupt whenever the destination write and read pointers differ in order to notify processor 102 that unread messages have been written to destination queue 124.

In some embodiments, agent(s) 128 have direct access to, and write messages to, destination queue 124. As described herein, it is advantageous to enable processor 102 to reserve slots in destination queue 124 for agent(s) 128. If agent(s) 128 write messages to destination queue 124, agent(s) 128 generate processor interrupts in order to notify processor 102 that unread messages have been written to destination queue 124. Alternatively, processor 102 can periodically read the message in the slot that is associated with the destination read pointer, as describer herein, to determine if unread messages have been posted to destination queue 124.

One technique for enabling processor 102 to reserve one or more slots in destination queue 124 is for processor 102 to advance the destination write pointer by an appropriate count of slots. This technique, however, requires that processor 102 quiesce mail handler 120 and agent(s) 126 in order to advance the destination write pointer. For example, processor 102 would need to (i) instruct agent(s) 126 to temporarily cease writing messages to source queue 122 and (ii) wait for mail handler 120 to finish transferring all messages in the process of being written to destination queue 124. To obtain the value of the destination write pointer, processor 102 can issue a read command to mailer handler 120. Having knowledge of the value of the destination write pointer, processor 102 advances the destination write pointer by the appropriate count of slots. Embodiments of the present disclosure recognize that inefficiencies exist in this technique. For example, the efficiency of this technique is reduced by a plurality of latencies. One type of latency is incurred while processor 102 quiesces mail handler 120. Another type of latency is incurred during the process in which processor 102 issues a read command to mail handler 120 to obtain the value of destination write pointer. Embodiments of the present disclosure provide a technique that eliminates or reduces the aforementioned latencies.

Embodiments of the present disclosure enable processor 102 to request that mail handler 120 reserve slots in destination queue 124. In contrast to the technique in which processor 102 advances the destination write pointer, mail handler 120 advances the destination write pointer in response to the request from processor 102. One advantage of embodiments of the present disclosure is that processor 102 does not have to quiesce mail handler 120 to reserve slots in destination queue 124. Latency incurred to quiesce mail handler 120 is eliminated. In various embodiments, mail handler 120 writes the addresses of the one or more reserved slots to a register that is local to processor 102. In some embodiments, processor 102 periodically polls this register to obtain the addresses of the one or more reserved slots. In other embodiments, mail handler 120 sends an interrupt that notifies processor 102 that mail handler 120 posted the addresses of the one or more reserved slots to the register. While processor 102 must perform a read to obtain the addresses of the one or more reserved slots, a read to a register that is local to processor 102 incurs less latency than issuing a read command to an agent such as mail handler 120. Embodiments of the present disclosure will now be described in greater detail with respect to FIGS. 3, 4, and 5.

Figure 3:
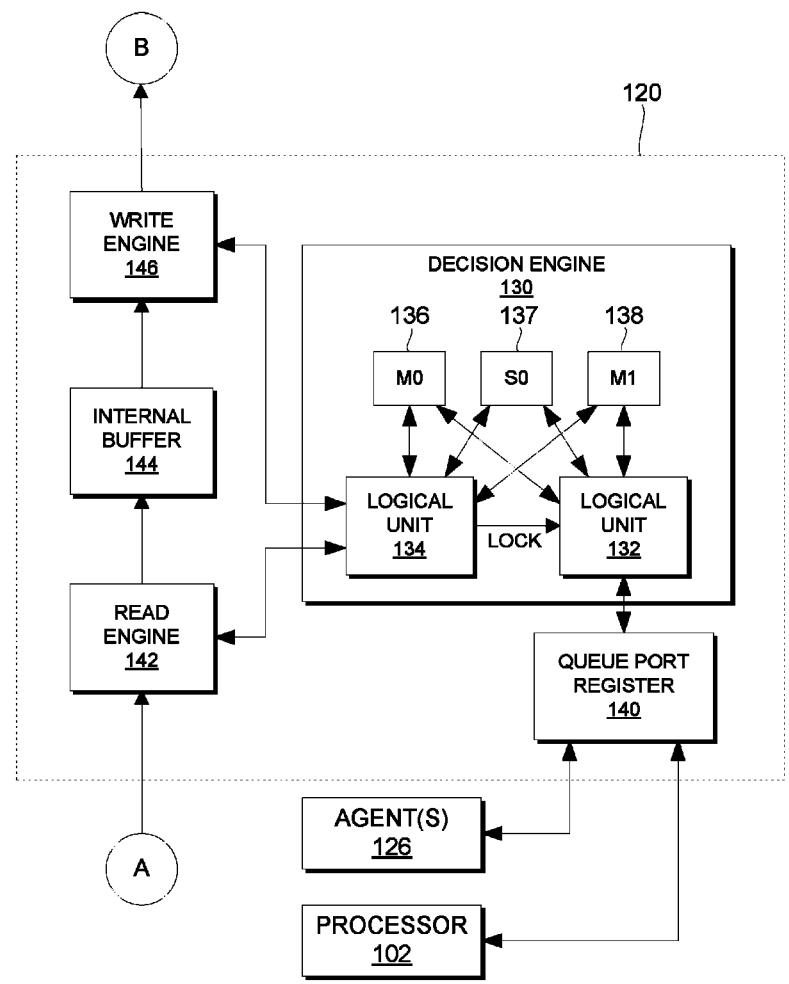
FIG. 3 is a block diagram that schematically depicts various aspects of the mail handler of the Mail system of FIG. 2, in accordance with an embodiment of the present disclosure.

FIG. 3 is a block diagram that schematically depicts various aspects of the mail handler of the Mail system of FIG. 2, in accordance with an embodiment of the present disclosure. Mail handler 120 includes decision engine 130, queue port register 140, read engine 142, internal buffer 144, and write engine 146.

In the embodiment depicted in FIG. 3, agent(s) 126 and processor 102 are communicatively connected to decision engine 130 via queue port register 140. Agent(s) 136 write, in queue port register 140, counts of messages that are to be transferred from source queue 122 to destination queue 124. Processor 102 writes, in queue port register 140, counts of slots that are to be reserved in destination queue 124. In some embodiments, queue port register 140 can include only one count of slots that are to be reserved in destination queue 124 (i.e., queue port register 140 can include only one pending reservation request). In such embodiments, processor 102 cannot reserve a second count of slots until mail handler 120 provides the one or more addresses that are associated with a first count of reserved slots. If, for example, slots are reserved as a contiguous range of slots, mail handler 120 must provide the address of at least one reserved slot. For example, mail handler 120 can provide the first count of reserved slots and the address of the slot at the beginning of the range of reserved slots. If the addresses of the reserved slots are discontiguous, mail handler 120 must provide a plurality of addresses before reserving the second count of slots (e.g., one or more individual addresses and/or one or more addresses at the beginning of a range of addresses). In other embodiments, queue port register 140 can include one or more counts of slots that are to be reserved in destination queue 124 (i.e., queue port register 140 can include one or more pending reservation requests).

Decision engine 130 coordinates the functions of mail handler 120 based, at least in part, on requests written to queue port register 140. Decision engine 120 also records and updates the values of the source read pointer, the source write pointer, and the destination write pointer. In the embodiment depicted in FIG. 3, decision engine 130 manages three registers. Register 136 (i.e., register M0) stores a count of pending messages that are to be transferred from source queue 122 to destination queue 124 before slots in destination queue 124 are reserved at the request of processor 102. Register 137 (i.e., register S0) stores a count of slots that are to be reserved in destination queue 124 at the request of processor 102. Register 138 (i.e., register M1) stores a count of the total messages to be transferred to destination queue 124 after reserving the count of slots reflected in register 137 (i.e., register S0). In an initialization phase, the value of registers 136, 137, and 138 are set to zero.

Decision engine 130 also includes logical unit 134 and logical unit 132. Logical unit 134 and logical unit 132 execute operations in parallel and manage registers 136, 137, and 138 in accordance with the operations depicted in FIGS. 4 and 5. While logical units 132 and 134 can operate in parallel, logical unit 134 has the ability to temporarily lock logical unit 132 to prevent logical unit 132 from updating registers 136, 137, and 138.

In the embodiment depicted in FIG. 3, logical unit 132 reads queue port register 140 in order to process requests to transfer messages from source queue 122 to destination queue 124 and reserve slots in destination queue 124. In various embodiments, logical unit 132 processes writes to queue port register 140 in the order in which the writes are received. Requests to transfer messages from source queue 122 to destination queue 124 are represented by positive numbers. The value of the positive number indicates a corresponding count of messages to transfer. Requests to reserve slots in destination queue 124 are represented by non-positive numbers (i.e., a zero or a negative number). A zero or a negative one indicate that mail handler 120 is to reserve one slot in destination queue 124. The value of a negative number that is less than negative one indicates a corresponding count of slots to reserve. If, for example, logical unit 132 reads the sequence [6, 7, −3, 5, 8] from queue port register 140, it would know to transfer six messages, transfer a further seven messages, reserve three slots, transfer five messages, and transfer a further eight messages. Logical unit 132 updates registers 136, 137, and 138 based, at least in part, on values read from queue port register 140, as discussed with respect to FIG. 4. In response to updating registers 136, 137, and 138, logical unit 132 sends acknowledgment signals to the requesters (i.e., one or more of agent(s) 126 or processor 102).

In the embodiment depicted in FIG. 3, logical unit 134 is communicatively connected to read engine 142 and write engine 146. Read engine 142 reads messages from source queue 122 and transfers the messages to internal buffer 144. Internal buffer 144 holds the messages until they can be written to destination queue 124. Internal buffer 144 is itself a queue (e.g., a first in first out [FIFO] queue). In some embodiments, internal buffer 144 is a memory space in memory 104. In other embodiments (e.g., embodiments where mail handler 120 is a controller), internal buffer 144 is a memory space in a memory that is local to mail handler 120. Write engine 146 reads messages from internal buffer 144 and writes the messages to destination queue 124. Write engine 146 also writes to a processor space (e.g., a register of processor 102) to provide one or more addresses from which processor 102 can identify any reserved slots in destination queue 124, as discussed herein. For example, write engine 146 can write, to the processor space, a count of reserved slots and the address of a slot that defines a contiguous range of addresses that include the reserved slots.

Figure 4:
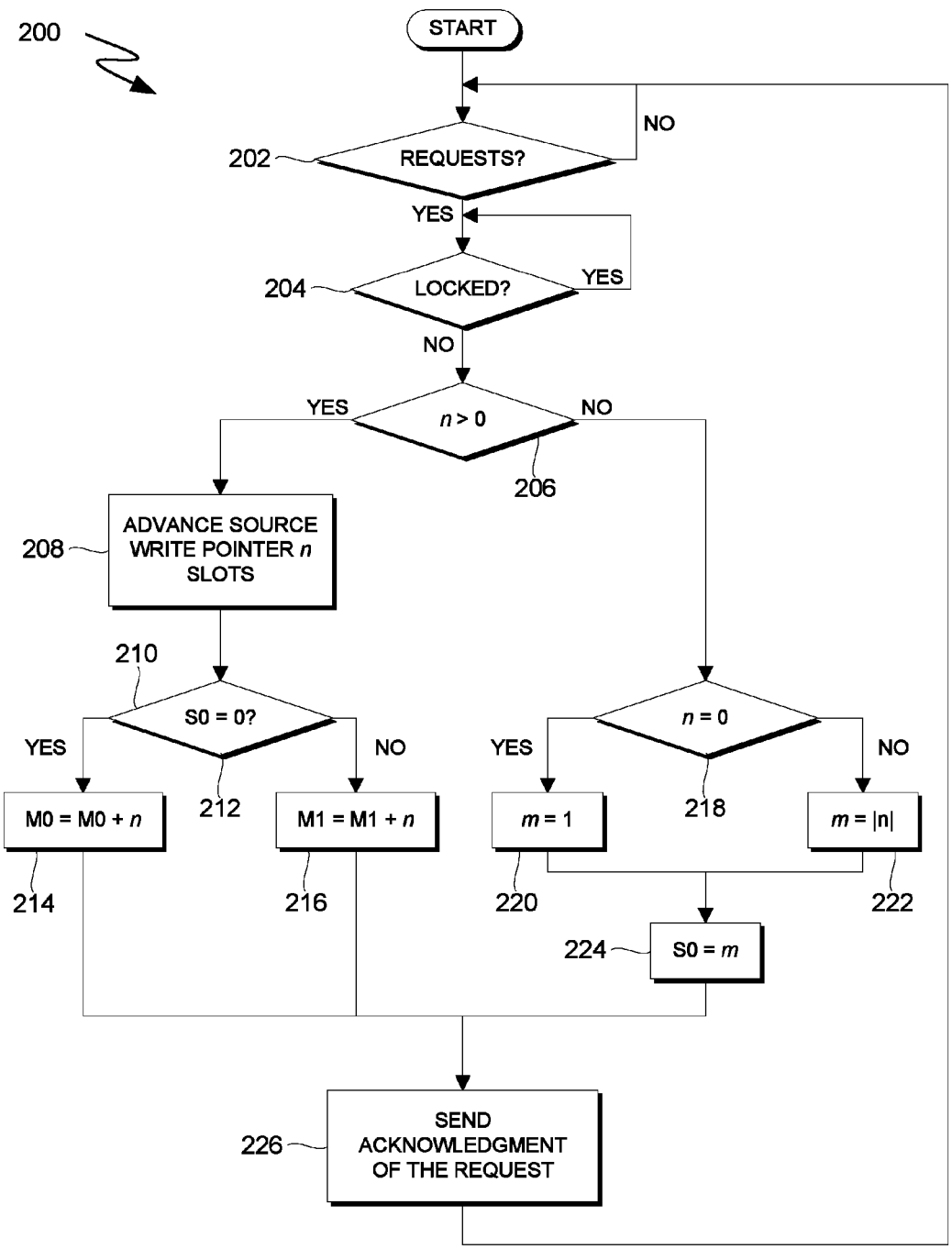
FIG. 4 is a flowchart that depicts operations of a first logical unit of the decision engine of FIG. 3, in accordance with an embodiment of the present disclosure.

FIG. 4 is a flowchart that depicts operations of a first logical unit of the decision engine of FIG. 3, in accordance with an embodiment of the present disclosure. Specifically, FIG. 4 depicts logic 200, which logical unit 132 executes in operation.

In the embodiment depicted in FIG. 4, logical unit 132 reads queue port register 140 to determine if one of agent(s) 126 has requested that mail handler 120 transfer a count of n messages or processor 102 has requested that mail handler 120 reserve a count of n slots (202). Logical unit 132 periodically reads queue port register 140 (decision 202, NO branch) until it determines that a request exists. If logical unit 132 determines that a request exists (decision 202, YES branch), logical unit 132 determines if logical unit 134 has sent a lock signal to logical unit 132 (204). Logical unit 132 remains locked (decision 204, YES branch) until logical unit 134 unlocks logical unit 132. If logical unit 132 determines that it is unlocked (decision 204, NO branch), logical unit 132 characterizes the request (206). As described herein, the value of n indicates whether the request is a request to transfer messages from source queue 122 to destination queue 124 or a request to reserve slots in destination queue 124. In the embodiment depicted in FIG. 4, the request is a request to transfer messages if the value of n is positive or a request to reserve slots if the value of n is zero or negative.

If the request is a request to transfer n messages from source queue 122 to destination queue 124 (decision 206, YES branch), logical unit 132 advances the source write pointer n slots (208). In addition, logical unit 132 updates register 136 (i.e., register M0; 214)) or register 138 (i.e., register M1; 216) based, at least in part, on whether or not a count of slots is to be reserved in destination queue 124 (i.e., whether or not the value stored in register 137/S0 is zero; 210). If no slots are to be reserved in destination queue 124 (decision 210, YES branch), logical unit 132 updates the value of register 136/M0 to the current value of the register plus n (214). Register 136/M0 indicates the total count of messages that are to be transferred from source queue 122 to destination queue 124 before mail handler 120 reserves any slots in destination queue 124. If one or more slots are to be reserved in destination queue 124 (decision 210, NO branch), logical unit 132 updates the value of register 138/M1 to the current value of the register plus n. Register 138/M1 indicates the total count of messages that are to be transferred from source queue 122 to destination queue 124 after the count of slots indicated by register 137/S0 is reserved in destination queue 124.

If the request is a request to reserve n slots in destination queue 124 (decision 206, NO branch), logical unit 132 determines the count of slots that are to be reserved (218). In the embodiment depicted in FIG. 4, one slot is to be reserved if n has a value of zero or negative one. If logical unit 132 determines that n has a value of zero (decision 218, YES branch), logical unit 132 sets m, a count of slots to reserve in destination queue 124, to one. If logical unit 132 determines that n has value that is not equal to zero (decision 218, NO branch), logical unit 132 sets m to the absolute value of n (222). In response to determining the appropriate value of m, logical unit 132 updates the value of register 137/S0 to the value of m (224).

In addition, logical unit 132 sends an acknowledgment of the request to one of agent(s) 126 or processor 102 based on whether logical unit 132 characterized the request as a request to transfer messages from source queue 122 to destination queue 124 or a request to reserve slots in destination queue 124 (226).

Figure 5:
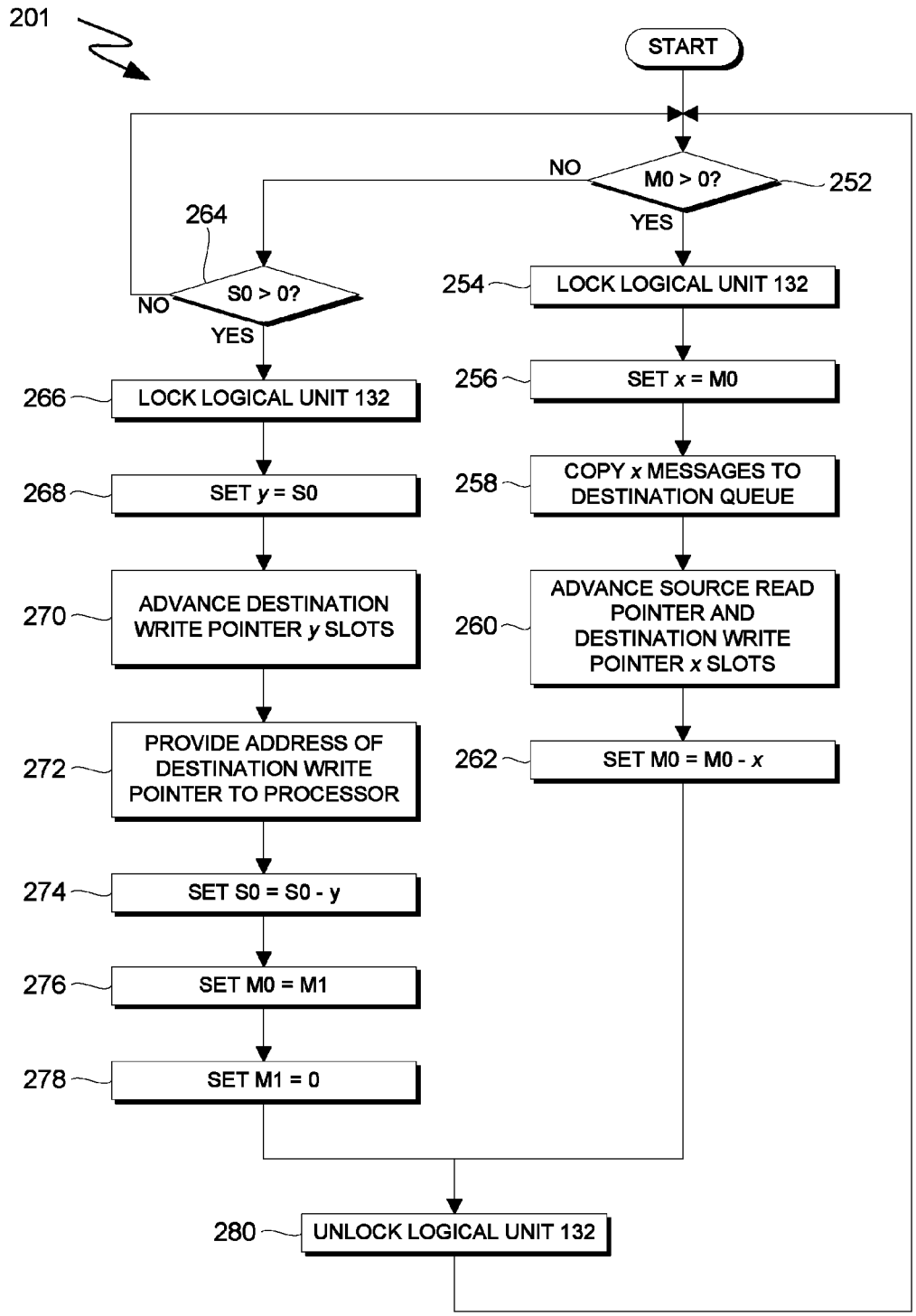
FIG. 5 is a flowchart that depicts operations of a second logical unit of the decision engine of FIG. 3, in accordance with an embodiment of the present disclosure.

FIG. 5 is a flowchart that depicts operations of a second logical unit of the decision engine of FIG. 3, in accordance with an embodiment of the present disclosure. Specifically, FIG. 4 depicts logic 201, which logical unit 134 executes in operation.

In the embodiment depicted in FIG. 5, logical unit 134 transfers messages from source queue 122 to destination queue 124 and reserves slots in destination queue 124 based, at least in part, on the values to which logical unit 134 sets registers 136 and 137 (i.e., registers M0 and S0). As described herein, the value of register 136/M0 indicates the count of messages that mail handler 120 is to transfer to destination queue 124 before reserving slots in destination queue 124. If the value of register 136/M0 is greater than zero, mail handler 120 must transfer messages before reserving slots. Accordingly, logical unit 134 periodically determines the value of register 136/M0 (252).

If the value of register 136/M0 is greater than zero (decision 252, YES branch), logical unit 134 locks logical unit 132 to prevent logical unit 132 from updating registers 136/M0, 137/S0, or 138/M1 while logical unit 134 is in the process of updating one or more of the registers (254). To transfer messages from source queue 122 to destination queue 124, logical unit 134 sets a count of x messages to transfer to the value of register 136/M0 (256) and instructs read engine 142 and write engine 146 to respectively transfer x messages from source queue 122 to internal buffer 144 and transfer x messages from internal buffer 144 to destination queue 124 (258). In addition, logical unit 134 advances the source read pointer and the destination write pointer by x slots (260), handling address wrapping as necessary. Logical unit 134 also sets the value of register 136/M0 to the current value of the register minus x (262). In the embodiment depicted in FIG. 5, updating register 136/M0 in this way will set the value of the register to zero. In embodiments were x is set to a value that is less than the initial value of register 136/M0, however, the register will have a positive value after transferring x messages. After updating register 136/M0, logical unit 134 unlocks logical unit 132 (280).

If the initial value of register 136/M0 is not greater than zero (decision 252, NO branch), logical unit 152 characterizes the value of register 137/S0 (264). The value of register 137/S0 indicates a count of slots to reserve in destination queue 124. If logical unit 134 determines that the value of register 137/S0 is not greater than zero (i.e., mail handler 120 does not need to reserve any slots in destination queue 124; decision 264, NO branch), logical unit 134 determines the value of register 126/M0 (decision 252). If logical unit 134 determines that the value of register 137 is greater than zero (i.e., mail handler 120 is to reserve slots in destination queue 124; decision 264, YES branch), logical unit 134 locks logical unit 132 to prevent logical unit 132 from updating registers 136/M0, 137/S0, or 138/M1 while logical unit 134 is in the process of updating one or more of the registers (266). To reserve y slots in destination queue 124, logical unit 134 sets y to the value of register 137/S0 (268) and advances the destination write pointer y slots (270). In the embodiment depicted in FIG. 5, logical unit 134 provides the address of the destination write pointer to processor 102 after reserving y slots (272). In other embodiments, logical unit 134 provides the value of y and the address of the destination write pointer prior to reserving y slots to processor 102. Logical unit 134 also updates the values of registers 136/M0, 137/S0, and 138/M1 in response to reserving y slots. Logical unit 134 updates the value of register 137/S0 to the initial value of the register minus y (274). In the embodiment depicted in FIG. 5, y is set to the value of register 137/S0 (i.e., y=m). Accordingly, updating the value of register 137/S0 sets the value to zero. The value of register 138/M1 indicates the count of messages that are to be transferred from source queue 122 to destination queue 124 after slots are reserved in destination queue 124 in accordance with the value of register 137/S0. In the embodiment depicted FIG. 5, logical unit 134 sets the value of register 136/M0 to the initial value of register 138/M1 (276) and sets the value of register 138/M1 to zero (278). In other words, the messages that were to be transferred after reserving a first count of slots are to be transferred before reserving a second count of slots. After updating registers 136/M0, 137/S0, and 138/M1, logical unit 134 unlocks logical unit 132 (280).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system comprising:
one or more computer processors;
one or more non-transitory computer readable storage media;
program instructions stored on at least one of the one or more non-transitory computer readable storage media for execution by at least one of the one or more computer processors, the program instructions comprising:
program instructions to instruct a mail handler to manage a source queue for incoming messages from one or more agents, the source queue having a first count of slots and being associated with a source read pointer and a source write pointer, wherein a first logical unit of the mail handler is instructed to manage the source write pointer and a second logical unit of the mail handler is instructed to manage the source read pointer;
program instructions to instruct the mail handler to manage a destination queue for outgoing messages to at least one computer processor, the destination queue having a second count of slots and being associated with a destination read pointer and a destination write pointer, wherein the second logical unit is instructed to manage the destination write pointer and the at least one computer processor is instructed to advance the destination read pointer in response to reading at least one message from the destination queue;
program instructions to instruct the first logical unit to read a first queue port register value from a queue port register, wherein:
a queue port register value equal to either zero or negative one indicates a count equal to one; and
a queue port register value of less than negative one indicates a count equal to an absolute value of the queue port register value;
program instructions to instruct the first logical unit to determine that the mail handler is to transfer a first set of one or more messages from the source queue to the destination queue based, at least in part, on the first queue port register value, wherein the first queue port register value is greater than zero, and in response, instruct the first logical unit to:
advance the source write pointer by a count of slots that is equal to the first queue port register value; and
set a value of a first register of the mail handler to the first queue port register value plus an initial value of the first register, wherein the initial value of the first register is a value of the first register prior to reading the first queue port register value, and the value of the first register indicates a count of pending messages to transfer from the source queue to the destination queue before reserving slots in the destination queue;
program instructions to instruct the second logical unit to determine that the mail handler is to transfer the first set of one or more messages from the source queue to the destination queue based, at least in part, on the value of the first register, wherein the value of the first register is greater than zero, and in response, instruct the second logical unit to:
lock the first logical unit;
transfer one or more messages from the source queue to the destination queue based, at least in part, on the value of the first register, wherein a count of the one or more messages transferred from the source queue to the destination queue is less than or equal to a count of messages in the first set of one or more messages;
advance each of the source read pointer and the destination write pointer by an amount equal to the count of the one or more messages transferred from the source queue to the destination queue;
set the value of the first register to the value of the first register minus the count of the one or more messages transferred from the source queue to the destination queue; and
unlock the first logical unit;
program instructions to instruct the first logical unit to read a second queue port register value from the queue port register;
program instructions to instruct the first logical unit to determine that the mail handler is to transfer a second set of one or more messages from the source queue to the destination queue based, at least in part, on the second queue port register value, wherein the second queue port register value is greater than zero, and in response, instruct the first logical unit to:
advance the source write pointer by an amount equal to the second queue port register value; and
determine that a value of a second register of the mail handler is not equal to zero, wherein (i) the value of the second register indicates a count of slots in the destination queue to reserve, and (ii) the value of the second register is based, at least in part, on a request of the at least one processor, and in response, instruct the first logical unit to:
set a value of a third register to the second queue port register value plus a previous value of the third register, wherein the previous value of the third register is a value of the third register prior to reading the second queue port register value, and the value of the third register indicates a count of messages to transfer from the source queue to the destination queue after reserving a count of slots in the destination queue; and
program instructions to instruct the second logical unit to determine that the mail handler is to reserve one or more slots in the destination queue based, at least in part, on the value of the second register, and in response, instruct the second logical unit to:
lock the first logical unit;
reserve the one or more of slots in the destination queue by advancing the destination write pointer by an amount equal to a count of the one or more slots;
provide at least one memory address to the at least one processor, wherein the at least one memory address enables the at least one processor to identify the one or more slots;

set the value of the second register to the value of the second register minus a count of the one or more slots reserved in the destination queue;
set the value of the first register to the value of the third register;
set the value of the third register to zero; and
unlock the first logical unit.

\* \* \* \* \*